United States Patent [19]

Seredich

[11] Patent Number: 4,773,141

[45] Date of Patent: Sep. 27, 1988

[54] CONSTANT VELOCITY AXLE, JOINT SEAL AND SEAL RETAINER RING HOLDER AND INSTALLATION PRESS

[76] Inventor: Stephan Seredich, P.O. Box 30359, Cleveland, Ohio 44130

[21] Appl. No.: 78,813

[22] Filed: Sep. 8, 1987

[51] Int. Cl.[4] .............................................. B23P 19/02

[52] U.S. Cl. .......................................... 29/251; 29/252

[58] Field of Search .................. 29/251, 252, 263, 257

[56] References Cited

U.S. PATENT DOCUMENTS

| | | | |
|---|---|---|---|
| 1,512,422 | 10/1924 | Hatcher et al. | 29/251 |
| 2,807,080 | 9/1957 | Mathews | 29/251 |
| 3,359,618 | 12/1967 | Murphy | 29/251 |

*Primary Examiner*—Robert C. Watson

[57] ABSTRACT

Different size holders and a press for installing constant velocity axle seals and metal retainer rings. The holders have internal walls which are angled $1\frac{1}{2}$ degrees to allow the axle, joint seal and metal retainer ring to be seated firmly and perpendicular on the holders internal shoulder, the holders can be moved in the press base to position it on the center line of the axle compression screw. The press base has an opening just large enough to allow the holders to be located under the screw if needed. The axle is then pressed into the joint seal and metal retainer ring. The press is portable and can be mounted on a horizontal surface. The axle can be pressed into the joint seal and metal retainer ring manually or by a powered air or hydraulic cylinder. Pressing the constant velocity axle into the joint seal and metal retainer ring eliminates clamping the constant velocity axle in a vise and hammering the seal and ring onto the axle. Eliminating the vise and the hammering will eliminate damaging the axle, seal and retainer, and also protect the installer and people near the installer from flying objects.

4 Claims, 4 Drawing Sheets

CONSTANT VELOCITY AXLE, JOINT SEAL AND SEAL RETAINER RING HOLDER AND INSTALLATION PRESS

FIELD OF INVENTION

Automobile or truck front wheel drive constant velocity axles, the axles' joint seal and metal retainer ring. This invention relates to the installation of the joint seal and the seals' metal retainer ring. Eliminating damage to the axle, seal and retainer ring during their installation and protecting the installer during the installation of the seal and retainer ring.

FEATURES OF THE INVENTION

The current method of installing joint seals and metal retainer rings on constant velocity axles are to install the joint seal and metal retainer ring on the axle and then clamp the axle into a vise and then drive the seal and ring on by hammering them onto the axle, this installation method can cause damage to the seal, metal retainer ring and to the axle by its clamping into a vise. Also the installer of the seal and ring or persons in the area of the installer can be injured by flying objects caused by the hammering.

It is the object of this invention to provide a holder which will retain a constant velocity axle, its joint seal and the joint seals metal retainer ring as a loose assembly.

It is a further object to provide a means of pressing the constant velocity axle into a joint seal and retainer ring so as not damage the axle, seal or ring.

It is a further object to provide different size holders so seals and retainer rings can be installed on different size axles.

It is a further object to provide a press which can be assembled and disassembled easily and to be mounted on a horizontal surface—To be portable.

It is a further object to provide a means of installing the seals and rings not only manually but also as either an air or a hydraulic operated press.

It is a further object to protect the installer of the seal and retainer ring and persons in the area of the installer by pressing the axle into the seal and retainer ring, thereby eliminating hammering the seal and ring onto the axle.

It is further objection to protect the installer by providing holders which will not slip out of the press while pressing the axle into the joint seal and retainer ring.

Other objects and features of the invention will be apparent in the following descriptions and claims in which the invention is describe, together with details to enable persons skilled in the art to practice the invention, all in connection with the best mode presently contemplated for the invention.

BRIEF DESCRIPTION OF THE DRAWINGS

Drawings accompaning the disclosure and the various views thereof may be briefly describe as.

DETAILED DESCRIPTION OF THE INVENTION AND THE MANNER AND PROCESS OF USING IT

Figure 3:
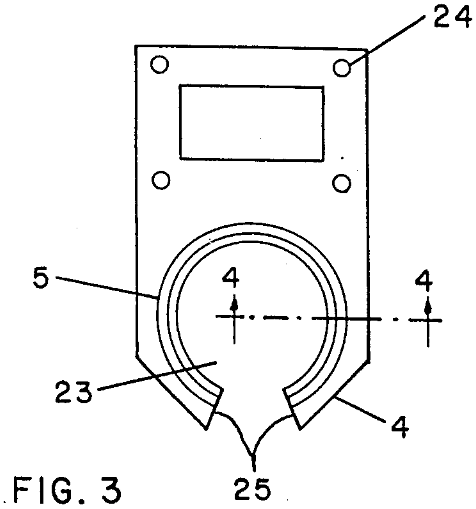
FIG. 3, a top view of FIG. 1 with 1, 2 and 6 removed.
Figure 4:
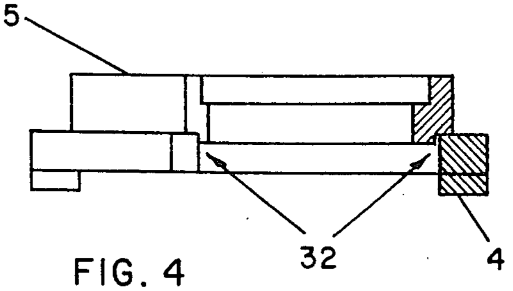
FIG. 4, a sectional veiw of 4 and 5 taken on line 4—4 of FIG. 3.
Figure 1:
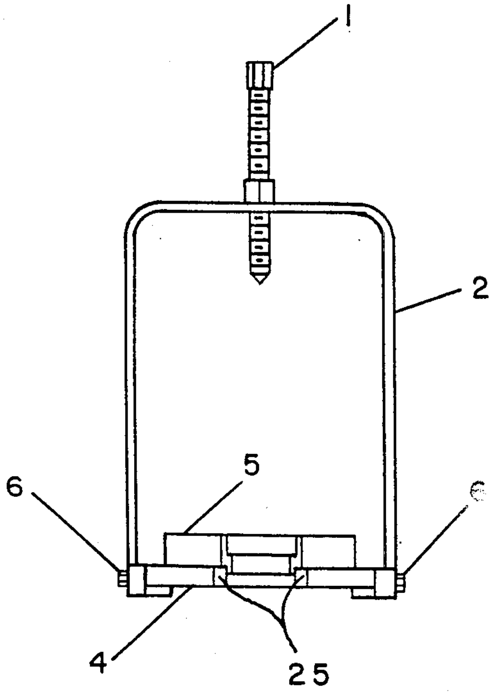
FIG. 1, a front view of the manual press with 1, 2 and 6 assembled to 4 with 6.
Figure 2:
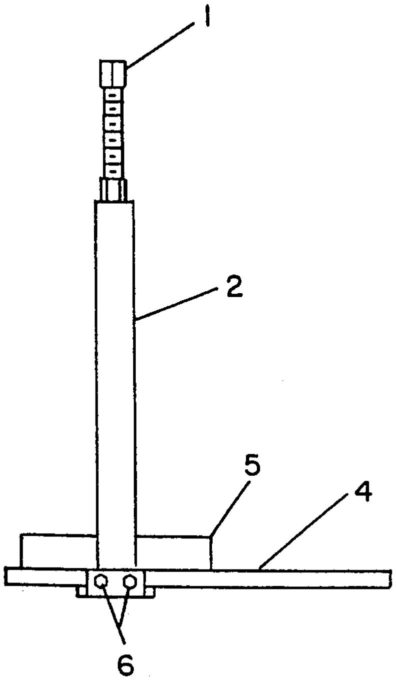
FIG. 2, a side view of FIG. 1.

With reference to the drawings, in FIG. 1 the compression screw 1 is installed in the frame 2, the frame 2 is then bolted 6 to the press base 4. The constant velocity axle joint seal and metal retainer holder 5 is placed in the opening in the press base 23 FIGS. 3 & 16. FIG. 3 press base 4 is supplied with mounting holes 24 which allows the press to be portable and mountable to any horizontal surface.

Figure 5:
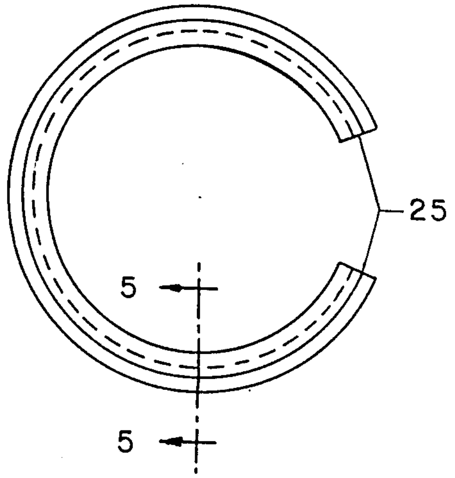
FIG. 5, a bottom view of the holder for the large constant velocity joint seal and metal retainer ring.
Figure 16:
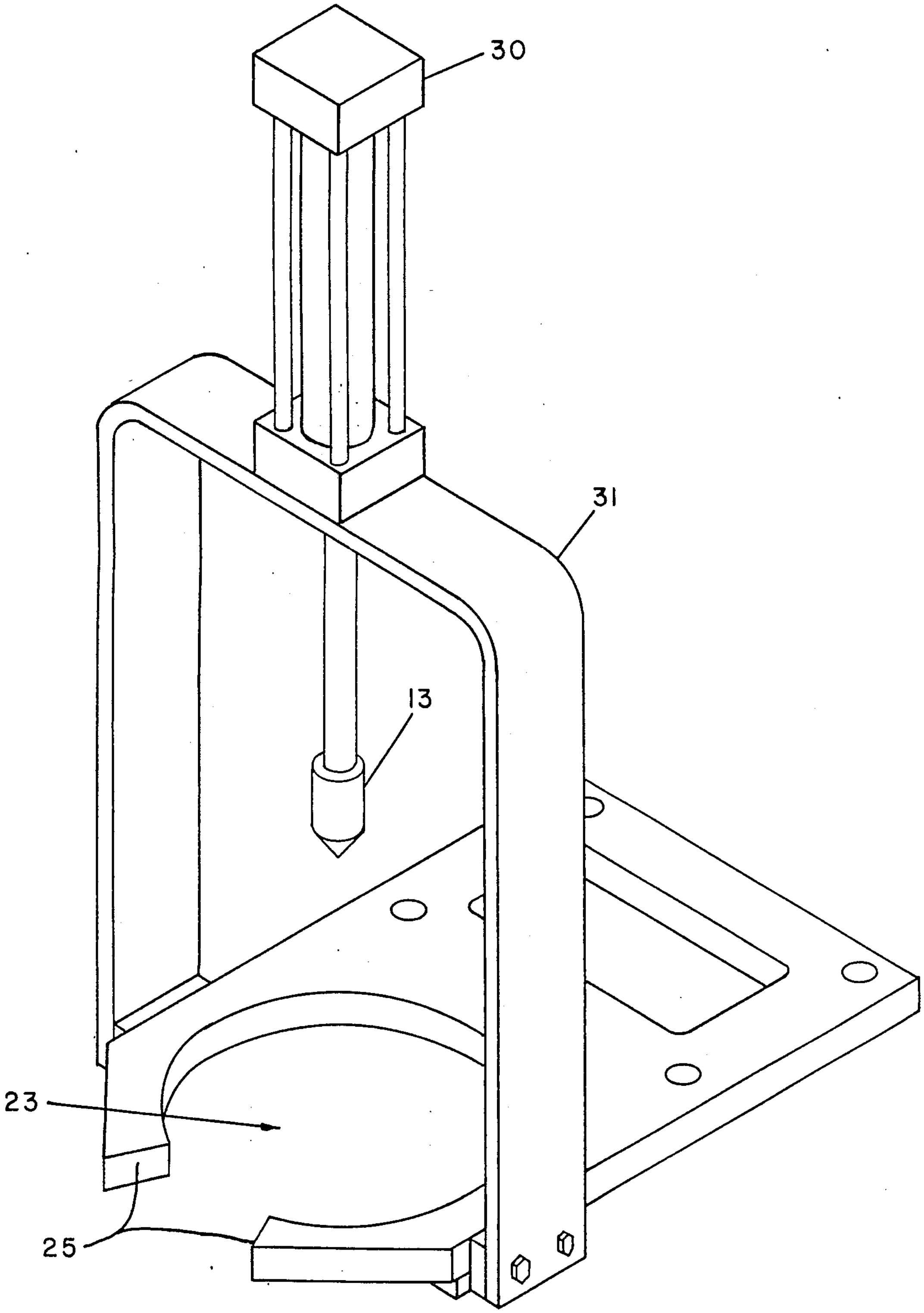
FIG. 16, an isometric view of the powered press, FIG. 13 assembled to the rod end of the cylinder, opening 23 for FIGS. 5 and 8, air or hydraulic cylinder 30, cylinder mounting frame 31.

FIG. 5, holder, and FIG. 3, press base 4 and FIG. 16, press base 4 is provided with an opening 25 to allow the constant velocity axle to be placed in the holder and press base.

Figure 7:
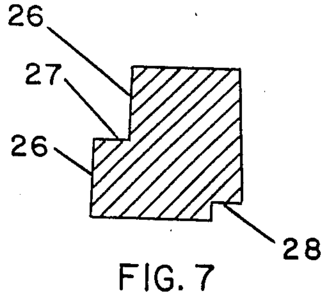
FIG. 7, a sectional view of FIG. 5 taken on line 5—5.
Figure 6:
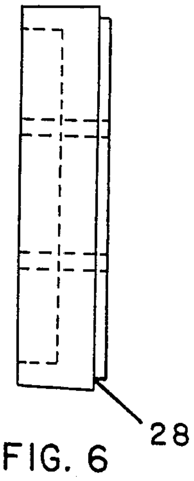
FIG. 6, a side view of FIG. 5.
Figure 10:
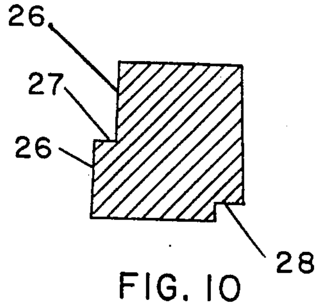
FIG. 10, a sectional view of FIG. 8 taken on line 8—8.
Figure 9:
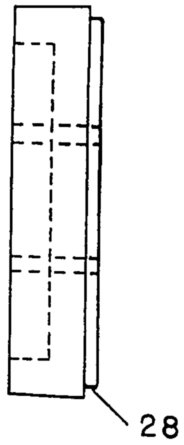
FIG. 9, a side veiw of FIG. 8.
Figure 8:
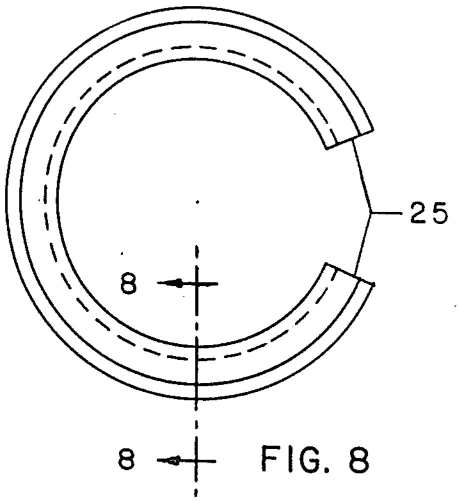
FIG. 8, a bottom view of the holder for the small constant velocity joint seal and metal retainer ring.
Figure 14:
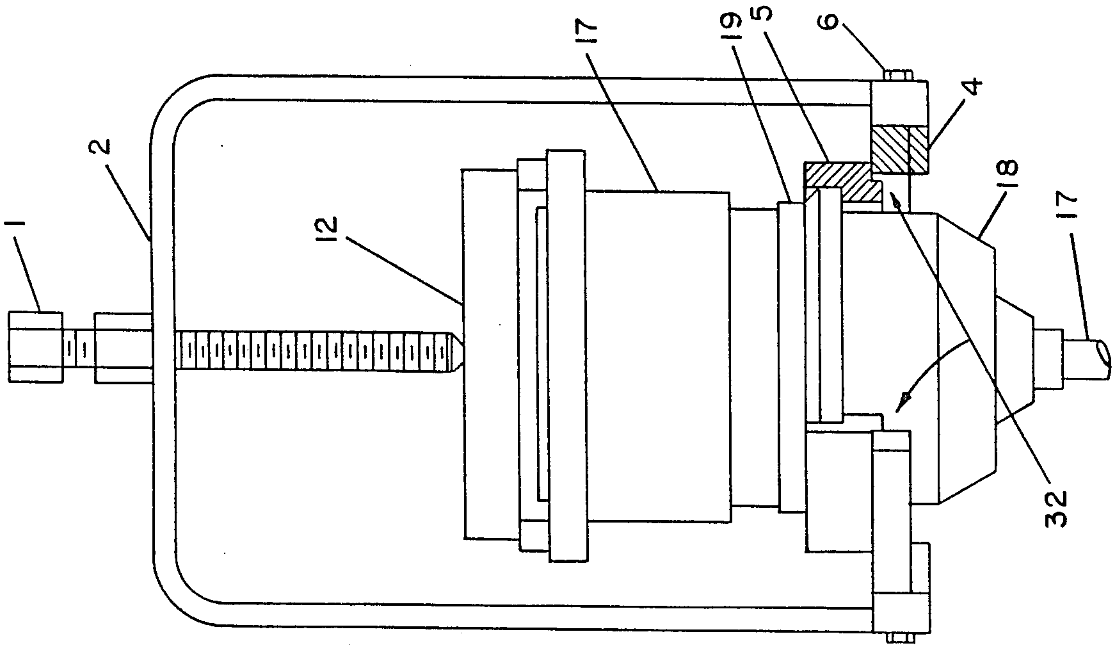
FIG. 14, a view of FIG. 1 sectioned thru line 4—4 of FIG. 3 also showing a large conctant velocity axle 17, joint seal 18, metal retainer ring 19 seated in the holder 5.

FIG. 7, the holders' internal walls 26 are angled 1½ degrees away from the center line of the holder to allow the joint seal and metal retainer ring to be seated properly on the 360 degree horizontal shoulder 27, a notch 28 around the outer perimeter is to allow the holder FIG. 5 to be seated in FIG. 14, base 4 and on the center line of 1. FIGS. 6 & 9 notch 28 fits into 23 FIGS. 3,4 & 16. FIGS. 4, 14 and 15, 32 to prevent the holders FIGS. 6 and 9 from slipping out of the press base 4 while the axles 17 and 20 are being pressed into the joint seals 18 and 21 and retainer rings 19 and 22. FIGS. 8, 9 and 10 are the same as FIGS. 5, 6 and 7 except it is used for a different size joint seal and metal retainer ring.

Figure 11:
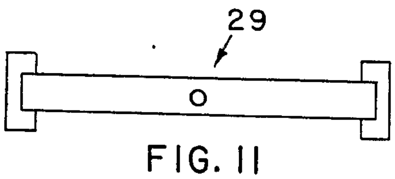
FIG. 11, a top view of the adapter for the compression screw and the constant velocity housing assembly.
Figure 12:
FIG. 12, a side view of FIG. 11.
Figure 15:
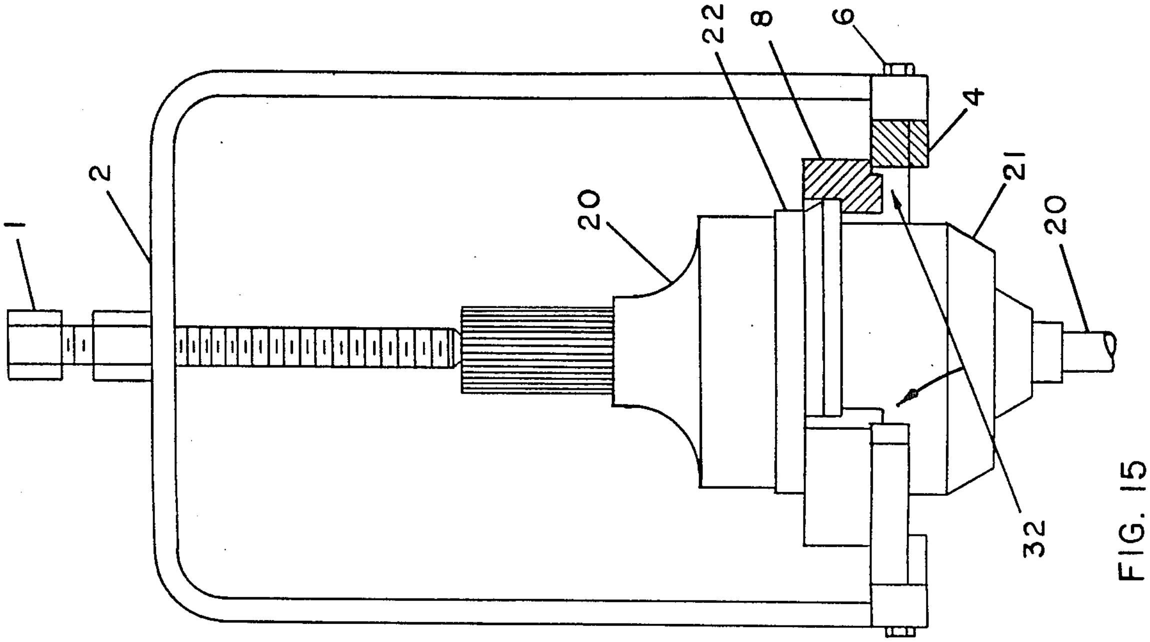
FIG. 15, a view of FIG. 1 sectioned thru line 4—4 of FIG. 3 also showing a small constant velocity axle 20, joint seal 21, metal retainer ring 22 seated in the holder 8.

FIG. 14, the joint seal 18 and metal retainer ring 19 is installed on the constant velocity axle 17 and then seated in the holder 5, adapter FIG. 11 has a seat 29 on its center line, FIG. 11 is placed on top of 17, then 12, 17 and 5 is centered under the compression screw 1, the compression screw 1 is then manually rotated to push 17 into 19 and 18 to complete the seal. FIG. 15 is the same as FIG. 14 except the axle 20 is different and the joint seal 21 and metal retainer ring 22 is a different size, and the holder 8 is sized to accept 21 and 22, FIG. 14 adapter 12 is not required.

Figure 13:
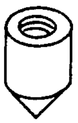
FIG. 13, an isometric view of the centering adapter used with an air or hydraulic cylinder.

FIG. 16 is the same as and used in the same manner as FIGS. 14 and 15 except the manual screw 1 and frame 2 in FIGS. 1,2,3, 14 and 15 is replaced with a standard industrial hydraulic or air cylinder 30 and its mounting 31, plus the cylinders' controls, adapter 13 FIG. 13 is screwed on the rod end of the cylinder to provide the mating part for 12 FIG. 14 and 20 FIG. 15.

I claim:

1. A press for seating a joint seal and metal retainer ring on a constant velocity axle, the press having an inverted U-shaped frame and base with a central opening therein; a holder for the axle, joint seal and metal retainer ring, said holder seated within and on the center line of the press, the holder having its internal walls angled away from the center line of the same to provide a shoulder for securely seating the retainer ring within the opening in the base, the holder being provided with a notch about its outer lower perimeter to secure the holder to the press base, the constant velocity axle being positioned on the center line perpendicular to the press base and compression means centered above the holder for pressing the axle into the joint seal and metal retainer ring.

2. A press as claimed in claim 1, wherein a centering bar in contact with compression means is disposed above the axle before application of pressure on the axle.

3. A press as claimed in claim 1, which is provided with a manually rotatable compression screw to draw the axle into the joint seal and retainer ring.

4. A press as claimed in claim 1, which is provided with a hydraulic cylinder and controls therefor, the cylinder being secured to the said mounting frame and operable to press the axle into the joint seal and metal retainer ring

* * * * *